United States Patent
Zhang et al.

(10) Patent No.: US 10,175,786 B2
(45) Date of Patent: Jan. 8, 2019

(54) FORCE TOUCH DISPLAY DEVICE AND FORCE TOUCH CONTROL METHOD

(71) Applicant: BOE Technology Group Co., Ltd., Beijing (CN)

(72) Inventors: Chunfang Zhang, Beijing (CN); Xiangxiang Zou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 153 days.

(21) Appl. No.: 15/279,909

(22) Filed: Sep. 29, 2016

(65) Prior Publication Data
US 2017/0205937 A1   Jul. 20, 2017

(30) Foreign Application Priority Data
Jan. 18, 2016   (CN) .......................... 2016 1 0030930

(51) Int. Cl.
G06F 3/041       (2006.01)
G06F 3/0488      (2013.01)

(52) U.S. Cl.
CPC ............ *G06F 3/041* (2013.01); *G06F 3/0488* (2013.01); *G06F 2203/04105* (2013.01)

(58) Field of Classification Search
CPC .... G06F 3/0412; G06F 3/0414; G06F 3/0416; G06F 3/041; G06F 2203/04105
See application file for complete search history.

(56) References Cited

U.S. PATENT DOCUMENTS

| | | | | |
|---|---|---|---|---|
| 5,241,308 | A * | 8/1993 | Young | G06F 3/0414 341/22 |
| 8,743,069 | B2 * | 6/2014 | Morton | G06F 1/169 345/156 |
| 9,141,225 | B2 * | 9/2015 | Cok | G06F 3/044 |
| 9,619,084 | B2 * | 4/2017 | Deichmann | G06F 3/0421 |
| 2010/0117989 | A1 * | 5/2010 | Chang | G06F 3/0414 345/175 |
| 2011/0248839 | A1 * | 10/2011 | Kwok | G06F 3/016 340/407.2 |
| 2012/0071206 | A1 * | 3/2012 | Pemberton-Pigott | G06F 3/0414 455/566 |
| 2013/0057489 | A1 * | 3/2013 | Morton | G06F 1/169 345/173 |
| 2013/0154938 | A1 * | 6/2013 | Arthur | G06F 3/041 345/168 |

(Continued)

FOREIGN PATENT DOCUMENTS

| CN | 101630211 A | 1/2010 |
|---|---|---|
| CN | 101739170 A | 6/2010 |

(Continued)

OTHER PUBLICATIONS

Dec. 18, 2017—(CN) First Office Action Appn 201610030930.0 with English Tran.

*Primary Examiner* — Patrick F Marinelli
(74) *Attorney, Agent, or Firm* — Banner & Witcoff, Ltd.

(57) ABSTRACT

A force touch display device, comprising a display panel and a force touch detecting module, wherein the force touch detecting module is arranged opposite to the display panel, and the force touch detecting module is configured to detect an amount of deformation of the force touch display device so as to determine a force level of a touch force. A force touch control method is also disclosed.

8 Claims, 4 Drawing Sheets

(56) References Cited

U.S. PATENT DOCUMENTS

| | | | | |
|---|---|---|---|---|
| 2013/0338847 | A1* | 12/2013 | Lisseman | H03K 17/9625 700/301 |
| 2014/0085247 | A1* | 3/2014 | Leung | G06F 3/0414 345/174 |
| 2014/0085253 | A1* | 3/2014 | Leung | G06F 3/0414 345/174 |
| 2014/0267122 | A1* | 9/2014 | Morton | G06F 1/169 345/173 |
| 2014/0354584 | A1* | 12/2014 | Cok | G06F 3/0414 345/174 |
| 2014/0354585 | A1* | 12/2014 | Cok | G06F 3/0414 345/174 |
| 2014/0368465 | A1 | 12/2014 | Beilker | |
| 2015/0277626 | A1* | 10/2015 | Shinkai | G06F 3/044 345/174 |
| 2015/0301657 | A1* | 10/2015 | Ando | G06F 3/0485 345/174 |
| 2016/0085355 | A1* | 3/2016 | Pirogov | G06F 3/041 345/174 |
| 2016/0092015 | A1* | 3/2016 | Al-Dahle | G06F 3/044 345/174 |
| 2016/0378255 | A1* | 12/2016 | Butler | G01L 1/146 345/174 |
| 2017/0090667 | A1* | 3/2017 | Abdollahian | G06F 3/0418 |
| 2017/0139517 | A9* | 5/2017 | Morton | G06F 3/0414 |
| 2017/0205937 | A1* | 7/2017 | Zhang | G06F 3/0488 |
| 2017/0269785 | A1* | 9/2017 | Abdollahian | G06F 3/0418 |
| 2017/0285840 | A1* | 10/2017 | Ding | G06F 3/0416 |
| 2017/0315662 | A1* | 11/2017 | Reynolds | G06F 3/0416 |
| 2018/0011583 | A1* | 1/2018 | Gui | G06F 3/0414 |
| 2018/0018036 | A1* | 1/2018 | Huang | G06F 3/044 |
| 2018/0025694 | A1* | 1/2018 | Al-Dahle | G06F 3/044 |
| 2018/0067601 | A1* | 3/2018 | Winokur | G06F 3/0414 |

FOREIGN PATENT DOCUMENTS

| | | |
|---|---|---|
| CN | 103019490 A | 4/2013 |
| CN | 104040892 A | 9/2014 |
| CN | 105103092 A | 11/2015 |
| WO | 2010115131 A3 | 1/2011 |

\* cited by examiner

FORCE TOUCH DISPLAY DEVICE AND FORCE TOUCH CONTROL METHOD

This application claims priority to and the benefit of Chinese Patent Application No. 201610030930.0 filed on Jan. 18, 2016, which application is incorporated herein in its entirety.

TECHNICAL FIELD

Embodiments of the present disclosure relate to a force touch display device and a force touch control method applicable to the force touch display device.

BACKGROUND

At present, as force touch technology has been introduced into electronic mobile terminals such as smart watches, smart phones and etc., force touch control gradually becomes a hot research direction.

Conventional force touch is typically implemented as capacitive type which is operated by use of principles of human induced current and resistive type which is operated by use of principles of force sensing. But, touch accuracy and sensitivity of the capacitive type force touch and the resistive type force touch are not high.

SUMMARY

At least one embodiment of the disclosure provides a force touch display device, comprising a display panel and a force touch detecting module, wherein the force touch detecting module is arranged opposite to the display panel, and the force touch detecting module is configured to detect an amount of deformation of the force touch display device so as to determine a force level of a touch force applied on the display panel.

At least one embodiment of the disclosure provides a force touch control method of force touch display device, the force touch display device comprising a display panel and a force touch detecting module, the force touch detecting module comprising a force touch detecting module substrate, the method comprises:
  measuring a distance between the force touch detecting module substrate and the display panel so as to determine the amount of deformation of the force touch display device;
  determining a force level of a touch force by use of the amount of deformation of the force touch display device
  according to the force level of the touch force, driving the display panel to perform an operation corresponding to the force level.

In the force touch display device according to embodiments of the present disclosure, the amount of deformation of the force touch display device detected by the force touch detecting module is an amount of physical deformation. Typically, the amount of physical deformation is influenced by the magnitude of the touch force and the material of the force touch display device, without any interference by surrounding electric signals. Therefore, when the display panel according to the embodiments of the present disclosure is subjected to a touch operation, the force level of the touch force can be accurately determined and thus operations corresponding to different touch forces can be accurately performed.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

Figure 1:
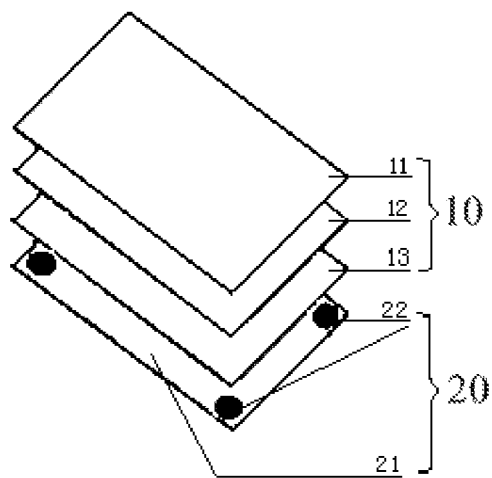
FIG. 1 is an illustrative structural view of a force touch display device according to one embodiment of the present disclosure.

REFERENCE SIGNS 10 display panel;
20 force touch detecting module
11 cover plate
12 panel;
13 backlight module;
14 reflective film
21 force touch detecting module substrate
22 sensor
221 transmitter
222 receiver

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

At least one embodiment of the present disclosure provides a force touch display device. As illustrated in FIG. 1, the force touch display device comprises a display panel 10 and a force touch detecting module 20. It can be seen from FIG. 1 that the force touch detecting module 20 and the display panel 10 are oppositely arranged, wherein the force touch detecting module 20 is configured to detect the amount of deformation of the force touch display device so as to obtain a force level of the touch force.

It can be appreciated that when a finger of an operator touches the force touch display device, a certain touch force is applied to the force touch display device which causes a certain amount of deformation of the force touch display device. In the force touch display device according to embodiments of the present disclosure, by detecting the amount of deformation of the force touch display device, the magnitude of the touch force can be determined and thus the force level of the touch force can be determined.

It is to be noted that the force touch detecting module is disposed without affecting normal display of the force touch display device. Different force levels correspond to different operations. The force touch display device is configured to perform a corresponding operation in accordance with the force level of the touch force.

For example, when the touch force is small, a first action menu will pop up on the operation interface. When the touch force is large, a second action menu will pop up on the operation interface. The first action menu and the second action menu have different contents and functions.

For example, the touch force can be classified into two levels, i.e., a level equal to or less than 1N and a level greater than 1N. The level equal to or less than 1N corresponds to light touch operation, while the level greater than 1N corresponds to pressing operation. When the value of the touch force is greater than 1N, the display panel 10 can be driven to perform the pressing operation. When the value of the touch force is less than or equal to 1N, the display panel 10 can be driven to perform the light touch operation.

In the present disclosure, the type of pressing operation is not particularly restricted. For example, when the touch position is located on the top of a folder, the pressing operation can open the folder. The light touch operation can be for example unlocking or previewing operation and the like. Of course, the above are merely examples of the light touching operation and the pressing operation, which are not limited in the present disclosure.

In the force touch display device according to embodiments of the present disclosure, the amount of deformation of the display panel detected by the force touch detecting module 20 is an amount of physical deformation. Typically, the amount of physical deformation is influenced by the magnitude of the touch force and the material of the force touch display device, without any interference by surrounding electric signals. Since the material of the display panel is constant, upon detecting by use of the force touch detecting module 20, the detected result of the amount of deformation is only influenced by the magnitude of the touch force. Therefore, when the display panel according to the embodiments of the present disclosure is subjected to a touch operation, the force level of the touch force can be accurately determined and thus operations corresponding to different touch forces can be accurately performed.

As described above, the force touch detecting module 20 is disposed without affecting normal display of the force touch display device. Thus, the force touch detecting module 20 can be disposed on a rear face of the display panel 10. Here, the rear face of the display panel 10 refers to an opposite side of the light-emitting side of the display panel 10.

In one embodiment of the present disclosure, as illustrated in FIG. 1, the display panel 10 can comprise a cover plate 11, a panel 12 and a backlight module 13. For example, the cover plate 11 can be a glass cover plate, and the panel 12 can be an in-cell touch panel or can be an on-cell touch panel. It is readily understood that the display panel 10 is configured to display an image.

The cover plate 11 is positioned at the light-emitting side of the display panel 10 which is a front face of the display panel 10. It is readily understood that the cover plate 11 is configured to protect the panel 12. The panel 12 is arranged between the cover plate 11 and the backlight module 13. The panel 12 can be a liquid crystal panel. The backlight module 13 is configured to provide light to the panel 12. The force touch detecting module 20 is disposed on the rear face of the display panel 10, which can be understood that the force touch detecting module 20 is disposed on the rear face of the backlight module 13.

In the present disclosure, the structure of the force touch detecting module 20 is not restricted. For example, the force touch detecting module 20 can comprise a strain gauge, and the strain gauge is adhered to the back of the display panel 10, and when the display panel 10 is deformed, the strain gauge is deformed accordingly. The strain gauge is configured to generate a signal associated with the deformation itself. The amount of deformation of the strain gauge can be calculated on the basis of the signal and thus the amount of deformation of the display panel 10 can be deduced, as the amount of deformation of the display panel 10 is the amount of deformation of the strain gauge.

Of course, the display panel according to the embodiments of the present disclosure is not limited to the above-described liquid crystal display panel. For example, the display panel 10 can be an organic light emitting diode display panel.

Figure 2:
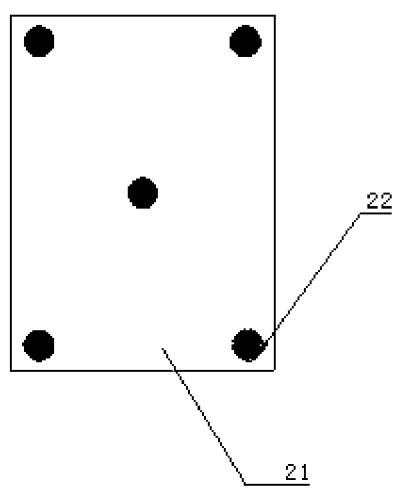
FIG. 2 is an illustrative structural view of a force touch detecting module according to one embodiment of the present disclosure.

To improve anti-interference capability and detecting accuracy of the force touch detecting module 20, as illustrated in FIG. 2, the force touch detecting module 20 according to the embodiments of the present disclosure comprises a calculation module (not shown), a force touch detecting module substrate 21 and a sensor 22 disposed on the force touch detecting module substrate 21. For example, there are five sensors disposed on the force touch detecting module substrate 21, the sensors 22 are respectively disposed at four corners of the force touch detecting module substrate 21 and at the center of the force touch detecting module substrate 21 respectively.

Figure 3:
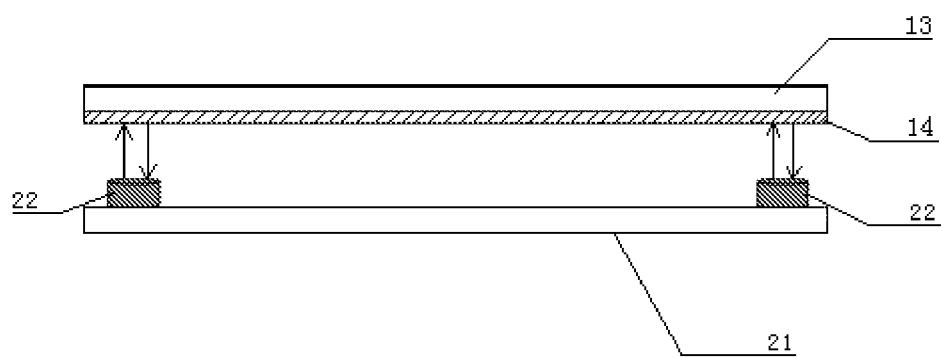
FIG. 3 is an illustrative sectional view of a force touch detecting module according to one embodiment of the present disclosure.

In one embodiment of the present disclosure, there is a gap between the force touch detecting module substrate 21 and the display panel 10, as illustrated in FIG. 3. For the sake of clarity, only the backlight module 13 in the display panel 10 and a reflective plate 14 disposed at the back of the backlight module are illustrated in FIG. 3.

In the embodiments of the present disclosure, the number of the sensors 22 disposed on the force touch detecting module substrate 21 is not fixed, but can be determined according to the size of the force touch detecting module substrate 21 and the requirement for sensitivity.

The force touch detecting module 20 can comprise one or more sensor(s) 22, which is/are configured to measure a distance between the force touch detecting module substrate 21 and the display panel 10 and can generate a sensing signal representing the distance between the force touch detecting module substrate 21 and the display panel 10 and send the sensing signal to the calculation module.

Accordingly, the calculation module is configured to determine the amount of deformation of the force touch display device on basis of the received sensing signal. And, the calculation module determines the force level of the touch force according to the amount of deformation of the force touch display device.

When the force touch detecting module 20 comprises one sensor 22, the sensor 22 can be disposed at an edge or the center of the force touch detecting module substrate 21. When the force touch detecting module 20 comprises a plurality of sensors 22, the plurality of sensors 22 can be disposed at the edge and/or the center of the force touch detecting module substrate 21 respectively. That is to say, positions where the plurality of sensors 22 are disposed on the force touch detecting module substrate 21 are not fixed, but can be arranged according to the size of the force touch detecting module substrate 21 and the requirement for sensitivity. It is to be noted that the configuration of the force touch detecting module 20 as shown in FIG. 2 is illustrative, and the number and positions of the plurality of sensors 22 contained in the force touch detecting module 20 on the force touch detecting module substrate 21 are not restricted to those illustrated in FIG. 2.

It is to be noted that, as illustrated in FIG. 3, there is a gap between the force touch detecting module substrate 21 and the display panel 10. For example, the force touch detecting module substrate 21 and the display panel 10 are connected by adhesives such as sealant. By controlling the amount of adhesives, the gap between the force touch detecting module substrate 21 and the display panel 10 can be adjusted.

As described above, the calculation module is configured to determine the amount of deformation of the force touch display device on basis of the received sensing signal. The following are two exemplified ways for the calculation module to determine the amount of deformation of the force touch display device based on the received sensing signal.

As a first way, an initial distance between the display panel 10 and the force touch detecting module substrate 21 in a state where the display panel has no deformation can be measured in advance and the value of the initial distance is preset in the calculation module. When the display panel is displaying, the sensor 22 can perform a real-time detection on the distance between the force touch detecting module substrate 21 and the display panel 10 and generate a real-time sensing signal. After receiving the real-time sensing signal sent by the sensor 22, the calculation module calculates a real-time distance between the display panel 10 and the force touch detecting module substrate 21 based on the real-time sensing signal received, and compares the real-time distance with the initial distance, so that the amount of deformation of the force touch display device can be calculated and thus the force value of the real-time touch force can be calculated and the force level of the current touch force can be determined.

As a second way, the sensor 22 is configured to detect an initial distance between the force touch detecting module substrate 21 and the display panel 10 in a state where there is no touch operation on the display panel (i.e., there is no touch force) and send an initial sensing signal to the calculation module where the initial sensing signal is stored. When the force touch display device is displaying, the sensor generates a real-time sensing signal representing the distance between the force touch detecting module substrate 21 and the display panel and send the real-time sensing signal to the calculation module. The calculation module compares the received real-time sensing signal with the initial sensing signal so as to obtain the amount of deformation of the force touch display device by calculation.

Figure 4:
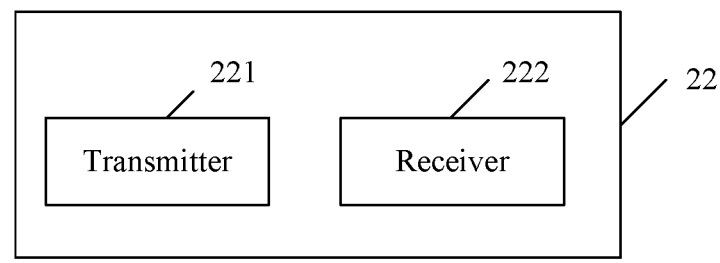
FIG. 4 is a schematic diagram of a sensor module according to one embodiment of the present disclosure.

In one embodiment of the present disclosure, as illustrated in FIG. 4, the sensor 22 can comprise a transmitter 221, a receiver 222 and a measuring circuit (not shown). The transmitter 221 is configured to transmit a detecting signal to the display panel 10, while the receiver 222 is configured to receive a detecting signal reflected by the display panel 10. The measuring circuit is configured to calculate a time difference between a first timing when the transmitter 221 transmits a detecting signal to the display panel 10 and a second timing when the receiver 222 receives a detecting signal reflected by the display panel 10, and to calculate a distance between the force touch detecting module substrate 21 and the display panel 10 based on the time difference.

In the present disclosure, the structure of the sensor 22 is not restricted. For example, the transmitter 221 and the receiver 222 can be two components independent from each other. Alternatively, the transmitter 221 and the receiver 222 can be integrally formed. In one embodiment of the present disclosure, the sensor 22 can comprise a laser sensor and in this case, the transmitter 221 can transmit a laser signal toward the display panel 10, while the receiver 222 can receive a laser signal reflected by the display panel 10.

The accuracy of the laser senor can be in micron order and can meet the requirement for detection of the amount of deformation of the force touch display device. For example, ZLDS13 laser displacement detector can have an accuracy of 1 micron.

As described above, the force touch display device is configured to perform different operations in accordance with different touch forces. In one embodiment of the present disclosure, the force touch display device comprises a touch driver module.

At least one preset value is preset in the calculation module. The at least one preset value defines a plurality of force ranges each of which corresponds to one force level. The calculation module is configured to calculate a value of the touch force based on the amount of deformation of the force touch display device and compare the calculated value with each of the preset values so as to determine the force level of the touch force and generate a corresponding determination signal.

The touch driver module is configured to drive the display panel to perform a corresponding operation after receiving the determination signal sent by the calculation module.

When there is one preset value, there are two force ranges defined by the preset value, i.e., a force range less than or equal to the preset value and a force range greater than the preset value.

When there are a plurality of preset values, the number of the force ranges defined thereby is equal to the number of the preset values plus one. For example, when there are two preset values, there are three force ranges defined: a force range less than or equal to the minimum preset value, a force range between the minimum preset value and the maximum preset value, and a force range greater than the maximum preset value.

For example, three preset values, i.e., a first preset value, a second preset value and a third preset value, can be provided in the calculation module. For the sake of description, the first preset value can be set as 1N, the second preset value can be set as 1.5N and the third preset value can be set as 2N. As such, the force ranges can comprise the following four ranges: (0, 1N], (1N, 1.5N], (1.5N, 2N], (2N, +∞). An operation corresponding to forces in (0, 1N] is entering an interface A. An operation corresponding to forces in (1N, 1.5N] is entering an interface B. An operation corresponding to forces in (1.5N, 2N] is entering an interface C. An operation corresponding to forces in (2N, +∞) is entering an interface D.

When a finger of an operator presses on the light emitting face of the display panel, the sensor 22 of the force touch detecting module 20 detects the distance between the force touch detecting module substrate 21 and the display panel 10 and generates a sensing signal representing the distance between the force touch detecting module substrate 21 and the display panel 10. The calculation module calculates the amount of deformation of the force touch display device based on the sensing signal and obtains a force value of the corresponding touch force on basis of the amount of deformation. The force value is compared with the first preset value of 1N, the second preset value of 1.5N and the third preset value of 2N respectively. If the calculated force value falls within the force range of (0, 1N], then the display panel 10 is controlled to display the interface A. If the calculated force value falls within the force range of (1N, 1.5N], then the display panel 10 is controlled to display the interface B. If the calculated force value falls within the force range of (1.5N, 2N], then the display panel 10 is controlled to display the interface C. If the calculated force value is greater than 2N, then the display panel 10 is controlled to display the interface D.

In one embodiment of the present disclosure, as illustrated in FIG. 3, to ensure the accuracy of distance measurement by the sensor, the force touch detecting module 20 is disposed at a side away from the light emitting face of the display panel, and a reflective film 14 is adhered to the rear face of the display panel 10. As the rear face of the display panel 10 is the rear face of the backlight module 13. Therefore, it can be understood that the reflective film 14 is adhered to the rear face of the backlight module 13.

It is to be explained that the term "light incident side of the display panel" refers to a side of the display panel from which light does not emit and the light incident side of the display panel is directed away from the light emitting side of the display panel.

In one embodiment of the present disclosure, the reflective film 14 can be made of materials comprising any one or more of polycarbonate, polyester, polyvinyl chloride and metallic materials. In one embodiment of the present disclosure, the polyester can be high temperature polyester. It can be appreciated that polymer materials such as polycarbonate, polyester, polyvinyl chloride serving as the reflective film can be directly coated on the rear face of the display panel 10, while metallic materials serving as the material of the reflective film has a large extinction coefficient. In both cases where polymer materials and metallic materials are used as the reflective film, the accuracy in distance measuring by the sensor can be improved.

In the force touch display device according to the embodiments of the present disclosure, by providing the force touch detecting module, the operation on the display panel can be distinguished into a light touch operation and a heavy pressing operation. In addition, by determining the amount of deformation of the force touch display device through measuring a variation in the distance between the force touch detecting module substrate and the display panel by a sensor in the force touch detecting module, not only the detection accuracy and sensitivity can be improved, but also interference upon detection can be avoided.

The type of the force touch display device is not restricted in the present disclosure. For example, the force touch display device can be an electronic device such as a cell phone, a tablet PC, a smart watch and the like.

Figure 5:
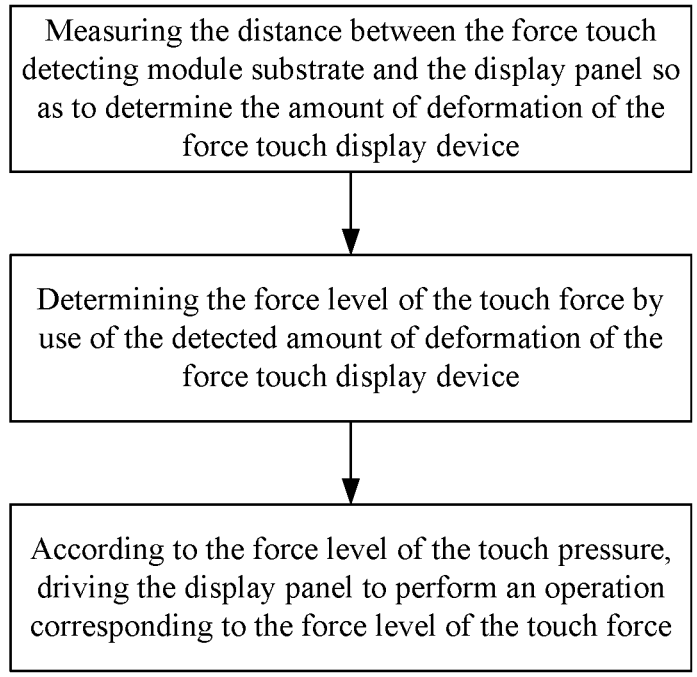
FIG. 5 is a flow chart of a force touch control method according to one embodiment of the present disclosure.

At least one embodiment of the present disclosure provides a force touch control method of the above-described force touch display device. As illustrated in FIG. 5, the method comprises:
   measuring a distance between the force touch detecting module substrate and the display panel so as to determine the amount of deformation of the force touch display device;
   determining a force level of the touch force by use of the amount of deformation of the force touch display device; and
   driving the display panel to perform an operation corresponding to the force level of the touch force according to the force level of the touch force.

After the amount of deformation of the force touch display device is determined, the force level of the touch force can be further determined, so that it can be determined on basis of the force level which kind of operation the display panel shall perform.

In one embodiment of the present disclosure, the force touch display device comprises a force touch detecting module substrate 21. There is a gap between the force touch detecting module substrate 21 and the display panel 10. It can be determined from the distance between the force touch detecting module substrate 21 and the display panel 10 whether the display panel is deformed or not as well as the amount of deformation of the force touch display device.

As for how to measure the distance between the force touch detecting module substrate and the display panel so as to determine the amount of deformation of the force touch display device, it is not restricted by the embodiments of the present disclosure. In one embodiment of the present disclosure, the method further comprises: before detecting the amount of deformation of the force touch display device, measuring an initial distance between the force touch detecting module substrate and the display panel in a state where there is no touch.

Figure 6:
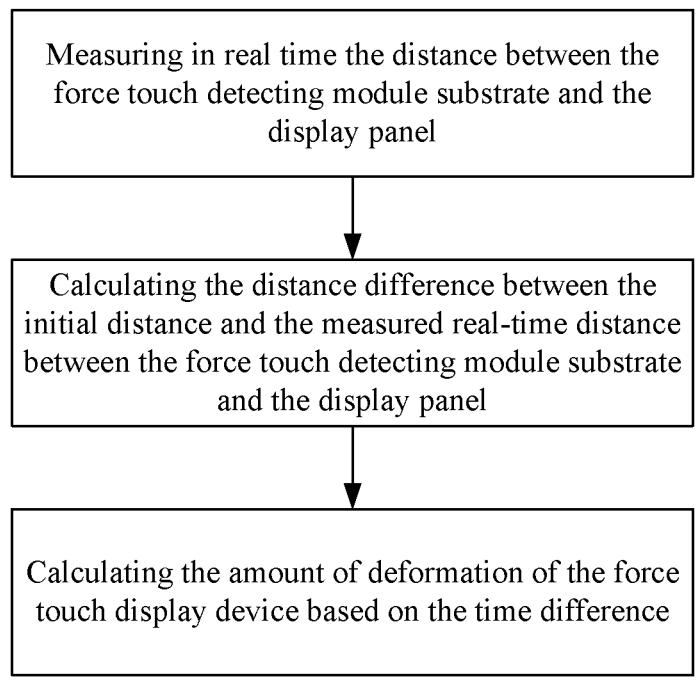
FIG. 6 is a schematic flow chart of measuring a distance between a force touch detecting module substrate and a display panel in the force touch control method as illustrated in FIG. 5.

Accordingly, as illustrated in FIG. 6, determining the amount of deformation of the force touch display device based on the distance between the force touch detecting module substrate and the display panel comprises:
   measuring a real-time distance between the force touch detecting module substrate and the display panel;
   calculating the difference between the initial distance and the real-time distance between the force touch detecting module substrate and the display panel; and
   calculating the amount of deformation of the force touch display device by use of the difference.

In the embodiments of the present disclosure, measuring the initial distance can be called as calibration. In the calibration, the initial distance between the display panel and the force touch detecting module substrate in case that the display panel is not deformed, i.e., there is no force touch on the display panel, is determined.

Figure 7:
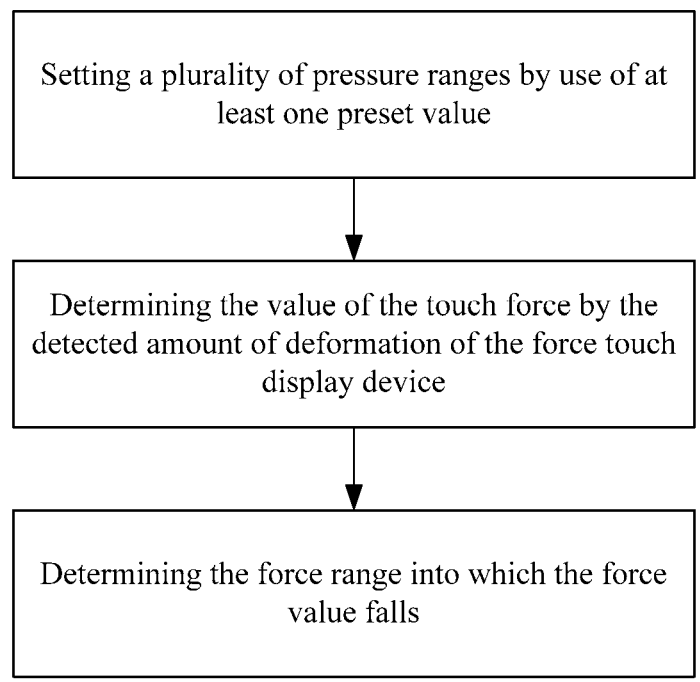
FIG. 7 is a schematic flow chart of determining a force level of the touch force by use of the amount of deformation of the force touch display device in FIG. 5.

In one embodiment of the present disclosure, as illustrated in FIG. 7, determining the force level of the touch force by use of the amount of deformation of the force touch display device can comprise:
   defining a plurality of force ranges by at least one preset value, each of the force ranges corresponding to one force level;
   determining the value of the touch force by the amount of deformation of the force touch display device; and
   determining the force range into which the force value falls.

Each force range corresponds to one force level. When the range into which the value of the touch force falls is determined, the force level corresponding to the touch force is determined. The foregoing has described in detail how to determine the force level of the touch force, which is omitted here.

In one embodiment of the present disclosure, the distance between the force touch detecting module substrate and the display panel can be measured by a laser sensor. For example, measuring the distance between the force touch detecting module substrate and the display panel comprises:
   transmitting a laser signal toward the display panel;

receiving a laser signal reflected by the display panel at the side where the laser is transmitted;

calculating a time difference between the timing when the laser signal is transmitted and the timing when the reflected laser signal is received; and calculating the distance between the force touch detecting module substrate and the display panel by use of the time difference.

This application claims priority to and the benefit of Chinese Patent Application No. 201610030930.0 filed on Jan. 18, 2016, which application is incorporated herein in its entirety.

In the force touch display device and force touch control method provided by the embodiments of the present disclosure, by providing the force touch detecting module in the force touch display device, the operation on the display panel can be distinguished into a light touch operation and a heavy pressing operation. In addition, by determining the magnitude of the force applied on the display panel from the amount of deformation calculated by the force touch detecting module, detection accuracy and sensitivity can be improved while improving anti-interference capability upon detection.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201610030930.0 filed on Jan. 18, 2016, the disclosure of which is hereby entirely incorporated by reference as a part of the present disclosure.

The invention claimed is:

1. A force touch display device, comprising a display panel and a force touch detecting module, wherein the force touch detecting module is arranged opposite to the display panel, and the force touch detecting module is configured to detect an amount of deformation of the force touch display device so as to determine a force level of a touch force applied on the display panel;

wherein the force touch detecting module comprises a calculation module and a force touch detecting module substrate, and wherein there is a gap between the force touch detecting module substrate and the display panel;

wherein the force touch detecting module further comprises one or more sensors disposed on the force touch detecting module substrate, which is/are configured to send a sensing signal, representing a distance between the force touch detecting module substrate and the display panel, to the calculation module;

wherein the calculation module is configured to determine the amount of deformation of the force touch display device based on the sensing signal, and the calculation module is configured to determine the force level of the touch force based on the amount of deformation of the force touch display device;

wherein each sensor of the one or more sensors comprises a transmitter, a receiver and a measuring circuit, wherein the transmitter is configured to transmit a detecting signal to the display panel, the receiver is configured to receive a reflected signal which is reflected back from the display panel, and the measuring circuit is configured to calculate a time difference between a time when the transmitter transmits the detecting signal and a time when the receiver receives the reflected signal, and calculate the distance between the force touch detecting module substrate and the display panel based on the time difference;

wherein the force touch display device further comprises a touch driver module, wherein at least one preset value is preset in the calculation module, the at least one preset value defines a plurality of force ranges, each of which corresponds to a force level, and the calculation module is configured to calculate a force value of the touch force based on the amount of deformation of the force touch display device and compare the calculated force value with each of the preset values so as to determine the force level of the touch force and generate a corresponding determination signal; and wherein the touch driver module is configured to drive the display panel to perform a corresponding operation after receiving the determination signal sent by the calculation module.

2. The force touch display device according to claim 1, wherein:

the force touch detecting module comprises one sensor which is disposed at an edge or a center of the force touch detecting module substrate; or the force touch detecting module comprises a plurality of sensors which are disposed at an edge and/or a center of the force touch detecting module substrate.

3. The force touch display device according to claim 1, wherein the sensor is configured to obtain an initial sensing signal representing an initial distance between the force touch detecting module substrate and the display panel when there is no touching operation on the display panel, and send the initial sensing signal to the calculation module, and to obtain a sensing signal representing a real time distance between the force touch detecting module substrate and the display panel and send the sensing signal to the calculation module, and the calculation module is configured to store the initial sensing signal, compare the sensing signal with the initial sensing signal, and calculate the amount of deformation of the force touch display device.

4. The force touch display device according to claim 1, wherein the sensor is a laser sensor.

5. The force touch display device according to claim 4, wherein the force touch detecting module is disposed at a light incident side of the display panel, and a reflective film is adhered to a face of the display panel facing to the force touch detecting module.

6. The force touch display device according to claim 5, wherein the reflective film is made of at least one of polycarbonate, polyester, polyvinyl chloride and metal.

7. A force touch control method for the force touch display device according to claim 1, comprising:

measuring a distance between the force touch detecting module substrate and the display panel so as to determine the amount of deformation of the force touch display device;

determining a force level of a touch force by use of the amount of deformation of the force touch display device; and according to the force level of the touch force, driving the display panel to perform an operation corresponding to the force level, wherein before determining the amount of deformation of the force touch display device by measuring the distance between the force touch detecting module substrate and the display panel, the method further comprises:

measuring an initial distance between the force touch detecting module substrate and the display panel in a state where there is no touch;

wherein measuring the distance between the force touch detecting module substrate and the display panel so as to determine the amount of deformation of the force touch display device comprises:
  measuring a real-time distance between the force touch detecting module substrate and the display panel;
  calculating a distance difference between the initial distance and the real-time distance; and
  calculating the amount of deformation of the force touch display device by use of the distance difference;
wherein determining the force level of the touch force by use of the amount of deformation of the force touch display device comprises:
  setting at least one preset value which defines a plurality of force ranges, each of the force ranges corresponding to one force level;
  determining a force value of the touch force by the amount of deformation of the force touch display device; and
  comparing the force value with each of the preset values and determining a force range into which the force value falls so as to determine the force level of the touch force.

8. The method according to claim 7, wherein at the time of measuring the distance between the force touch detecting module substrate and the display panel so as to determine the amount of deformation of the force touch display device, measuring the distance between the force touch detecting module substrate and the display panel comprises:
  transmitting a laser signal from the force touch detecting module substrate toward the display panel;
  receiving a laser signal reflected by the display panel at the force touch detecting module substrate;
  calculating a time difference between a time when the laser signal is transmitted and a time when the reflected laser signal is received; and
  calculating the distance between the force touch detecting module substrate and the display panel by use of the time difference.

* * * * *